(12) United States Patent
Nikitin

(10) Patent No.: US 7,209,596 B2
(45) Date of Patent: Apr. 24, 2007

(54) METHOD OF PRECISION CALIBRATION OF A MICROSCOPE AND THE LIKE

(75) Inventor: Arkady Nikitin, Ardsley, NY (US)

(73) Assignee: General Phosphorix, LLC, Ardsley, NY (US)

( * ) Notice: Subject to any disclaimer, the term of this patent is extended or adjusted under 35 U.S.C. 154(b) by 280 days.

(21) Appl. No.: 10/966,558

(22) Filed: Oct. 15, 2004

(65) Prior Publication Data

US 2005/0220362 A1   Oct. 6, 2005

Related U.S. Application Data

(63) Continuation-in-part of application No. 09/346,902, filed on Jul. 2, 1999, now Pat. No. 6,807,314.

(51) Int. Cl.
$G01N\ 23/00$ (2006.01)
$G21K\ 7/00$ (2006.01)

(52) U.S. Cl. .................. 382/255; 250/306; 250/310

(58) Field of Classification Search ................ 382/255; 250/305, 306, 307, 308, 310, 311
See application file for complete search history.

(56) References Cited

U.S. PATENT DOCUMENTS 4,677,296 A * 6/1987 Lischke et al. ............. 250/310
4,818,873 A * 4/1989 Herriot ....................... 250/310
5,822,875 A * 10/1998 Feldner ........................ 33/494
5,825,670 A * 10/1998 Chernoff et al. ............ 702/85

* cited by examiner

Primary Examiner—Thomas D. Lee
(74) Attorney, Agent, or Firm—I. Zborovsky

(57) ABSTRACT

A method of precision calibration of a microscope magnification with calculating a magnification scale as a quotient obtained when an image size of a test object viewed or collected with the microscope is divided by a true test object size, the methods comprising the steps of obtaining a magnification reference by taking a diffraction grating with a tested pitch value as the test object; distributing a brightness level between 30–70% amplitude in one of an image of the diffraction grating and a video signal obtained in the microscope; calculating a position of the video signal "center of mass" for each of formed "islands" of the brightness distribution; considering an average distance between neighboring "center of mass" as being a grating pitch in a microscope image of the object; and recognizing that a magnification scale of the microscope is a result of a division of an average pitch dimension by true grating pitch.

1 Claim, 4 Drawing Sheets

METHOD OF PRECISION CALIBRATION OF A MICROSCOPE AND THE LIKE

CROSS REFERENCE TO A RELATED APPLICATION

This application is a continuation-in-part of application Ser. No. 09/346,902 filted Jul. 2,1999 now U.S. Pat. No. 6,807,314.

BACKGROUND OF THE INVENTION

The present invention relates to a method for precision magnification calibration of image magnifying devices, such as optical microscopes, confocal scanning microscopes, transmission electron microscopes, scanning electron microscopes, tunneling microscopes and atomic force microscopes.

Technical advances in many scientific fields are placing demands for increasing accuracy of feature measurements made using image-magnifying instruments [micro-scopes], in the size ranges of millimeters, microns and nanometers. In particular, the need arises because of the increasing miniaturization and complexity of integrated circuits and cellular studies in the field of bioengineering.

However, accurate size measurements cannot be made with a microscope unless it has first been calibrated with a magnification reference "standard" (standard is defined as a device having a verifiable value). The reliability of the information obtained from microscope image measurements depends on the accuracy of the microscope's magnification calibration. Any error in the magnification calibration of a microscope is a component of the total size measurement error and frequently is the predominant component. The magnification scale M of the microscope is determined by the ratio. M=L'/L. L is the size of the test object (measurement reference) used for the magnification calibration; L' is the size of the same test object realized in the microscope image (the magnified image of the object).

The methods of magnification calibration are known B. B. Martinov, "Problems of Measurements of Linear Sizes of Relief Sub Micron Structures on Raster Electronic Microscopes" preprint #501IOFAN.M, 1990, page 18, assuming use of a line-width standard (magnification reference) as the test object. Thus, it is considered that the nominal size L of the magnification reference is known with an adequate accuracy. However, obtaining the exact pitch value L' from the microscope's image of the test object pattern appears to be a problem in this case. The fact is that a ratio between an object and its image is rather nontrivial.

In any kind of microscopy the image is only similar to the object, but is never an exact copy. In particular, there are no universal rules, according to which it would be possible to specify points on the image corresponding to object edges (the distance between which is the image size L'). This is the reason for significant errors in the value of L' and for microscope magnification calibration errors as a whole. In B. B. Martinov's "Problems of Measurements of Linear Sizes of Relief Sub Micron Structures on Raster Electronic Microscopes" preprint #501IOFAN.M, 1990, page 18, the results of a practical application of this method are given. The calibration error of the Scanning Electron Microscope (SEM) was calculated by the authors as 2.6% in one case and as 5.1% in the other case. This is not an acceptable magnification error for a SEM used to perform accurate measurements. Such SEMs require their magnification error to be less than 0.5%.

The use of a pitch magnification reference material as a standard for magnification calibration M. T. Postek, Critical Issues in Scanning Electron Microscopes Metrology, Journ. Of Research of the National Inst. of Standards & Technol., Vol. 99, No. 5, October 1994, pp. 658–660 provides significant advantages in the precision of a microscope's magnification calibration. As the pitch reference contains several or many repeatable identical features (lines or stripes). Independent of the type or model of microscope being calibrated, these patterned lines will appear to be identical to each other. This strongly facilitates evaluation of the pitch value of such structures present in the microscope image: the distance between any equivalent points of adjacent stripe pattern features in the image can be considered as the pitch value. Such points can be established or noted by using the maxima or minima of brightness in the video signal, any repeated characteristic features on the videosignal slopes, etc. In order to implement such a method, firstly it is necessary to create and certify the indicated pitch magnification references with a known accuracy (creating a standard), there by correlating their nominal pitch size to an absolute size scale. Both of these problems are not simple. According to M. T. Postek, Critical Issues in Scanning Electron Microscopes Metrology, Journ. Of Research of the National Inst. of Standards & Technol., Vol. 99, No. 5, October 1994, pp. 658–660, for these reasons up to the present time only two pitch magnification references have been certified to be used as SEM magnification standards. They have the required characteristics and have been created with nominal pitch values less than 1 micron [NIST Standard Reference Materials SRM484 and SRM-2090]. Such magnification references are unique, expensive and not readily available for most users.

In particular, pitch magnification reference SRM-2090 contains 8 separate parallel line structures, the pitch value between adjacent line features is about 200 nanometers. It is known that optical diffraction methods can be used to provide highly precise and accurate pitch certifications of a diffraction grating. However, one is not able to apply these techniques to the certification of NIST SRM-484 and SRM-2090 because of the small number of repeated lines. For these purposes the authors U.S. Pat. No. 5,822,875 had to provide a special unique measuring environment that protected the SEM from vibrations and contained a precision stage with a laser inteiferometer, operating under computer control. The achievable accuracy of measurement certification is not given by the authors [U.S. Pat. No. 5,822,875].

Previous inventions attempted to improve the accuracy of SEM measurements, but had a number of drawbacks. A major issues that these inventions failed to provide a universal solution for accurate magnification calibration of image magnifying instruments. More specifically, the invention described in the patent "Scanning electron microscope ruler and method", U.S. Pat. No. 5,822,875, is restrictive because it requires fabrication of precision features on the integrated circuits to be inspected. This precludes the method from being readily available to a wide number of microscope users. More importantly, the ruler method described in the patent U.S. Pat. No. 5,822,875 did not provide for the highest degree of precision and accuracy. This degree is achievable in our proposed invention.

In the patent, "Apparatus and method for measuring length in scanning particle microscope" U.S. Pat. No. 4,677, 296, the propose measuring references provided an inferior degree of magnification calibration because they cannot be used as an absolute magnification standard. In addition they do not incorporate the necessary algorithms to determine the statistical measurement errors. Thus, the degree of accuracy of the magnification measurement is unknown. In contrast, our proposed invention enables the user to precisely determine the magnification errors in the microscope.

Finally, the invention described in patent, "High precision calibration and feature measurement system for a scanning probe microscope" U.S. Pat. No. 5,825,670 is measuring instrument specific, and has limited use because it requires direct control of the SEM's' scan drive circuitry. Also, it cannot be applied to non-scanning image magnifying instruments. In contrast, our proposed invention can be universally applied to any image magnifying device.

SUMMARY OF THE INVENTION

The primary object of this invention is to provide a magnification reference with a high degree of pitch accuracy such that it may be employed as a magnification standard.

Another object is to provide for the use of the set of algorithms for use with any magnification references-such that the references are composed of equally spaced, parallel line patterns.

Another object of the invention is to provide for the use of our proposed magnification reference to further increase the accuracy of the magnification calibration.

Another object of the invention is to provide for further increasing of the magnification calibration accuracy on the basis of using a procedure for cutting off the intensity distribution (or videosignal), which is realized in the microscope's image, and subsequent calculation of the set of the "center of mass" positions $x_0$ of the formed "islands".

Another object of the invention is to provide a set of software algorithms for scanning image magnifying instruments (e.g. scanning electron microscopes, conical scanning microscopes, tunneling microscopes and atomic force microscopes).

Another object of the invention is to provide a set of software algorithms for non-scanning image magnifying instruments (such as an optical microscope, transmission electron microscopes) where the image is acquired in a digital form, for example using a CCD camera attached to the microscope.

Another object of the invention is to provide a precise magnification calibration of a scanning type image magnifying instrument in the horizontal direction of the image plane, such as the horizontal direction of an SEM's scan.

A further object of the invention is to provide a precise magnification calibration of a scanning type image magnifying instrument in the vertical direction of the image-plane such as the vertical direction of an SEM's scan.

Another object of the invention is to provide an independent calibration in the horizontal and vertical directions of the image plane for scanning type image magnifying instruments.

In keeping with these objects and with others which will become apparent hereinafter, one feature of the present invention resides, briefly stated, in a method of precision calibration of a microscope magnification with calculating a magnification scale as a quotient obtained when the image size of a test object viewed or collected with the microscope is divided by the true test object size, comprising the steps of obtaining a magnification reference by taking a diffraction grating with a tested pitch value as the test object; distributing a brightness level between 30–70% amplitude of the video signal image of a diffraction grating obtained in the microscope; calculating the position of the video signal "center of mass" for each of the formed "islands" of the brightness distribution; considering an average distance between neighboring "center of mass" as being a grating pitch in a microscope image of the object; and recognizing that a magnification scale of the microscope is a result of a division of an average pitch dimension by true grating pitch.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
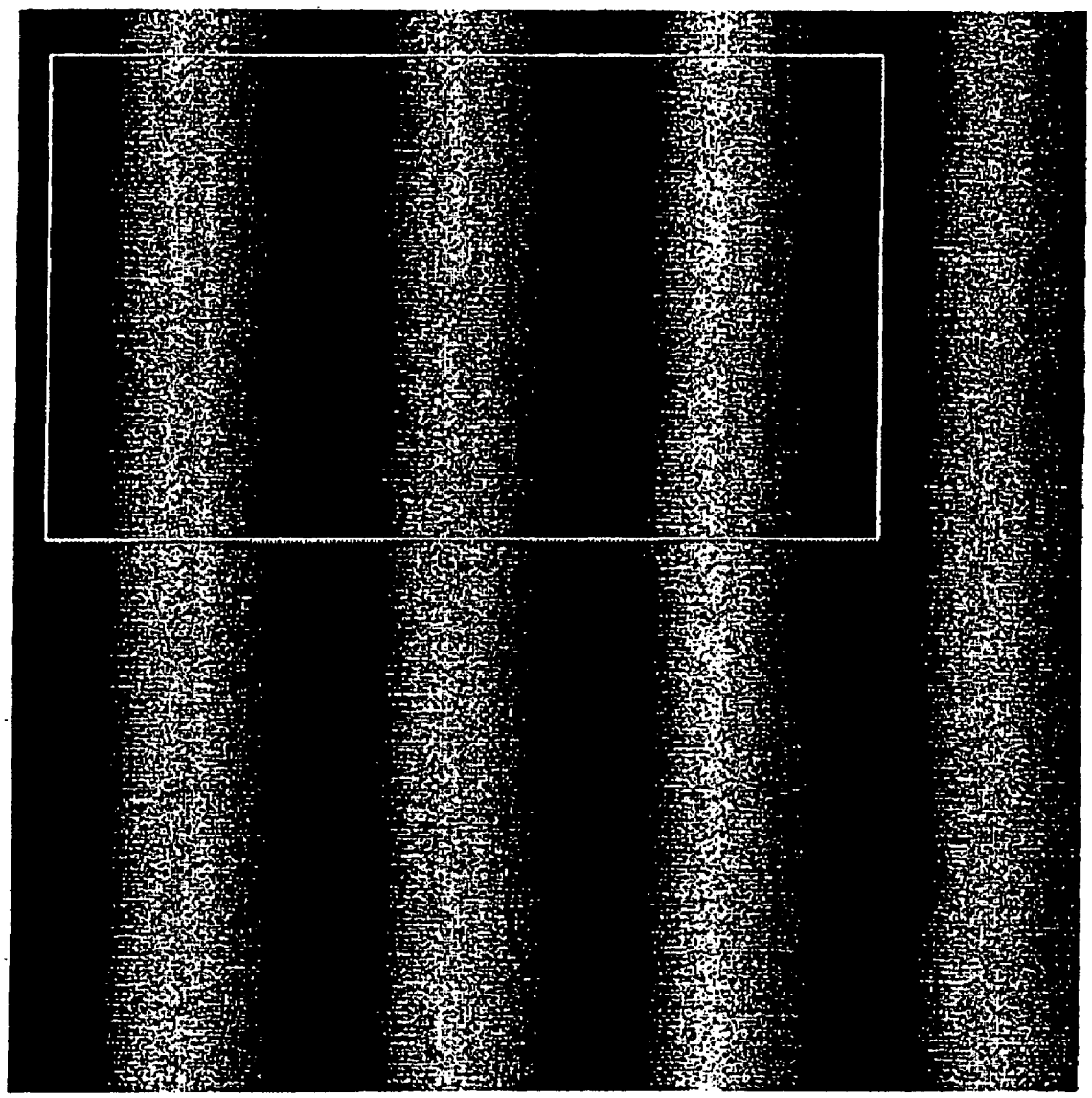
FIG. 1 shows the window in which the portion of the SEM-image of the diffraction grating is processed and the pitch value $T_n'$ calculated. This window is placed on the background of the ordinary SEM-image of the grating.
Figure 2A:
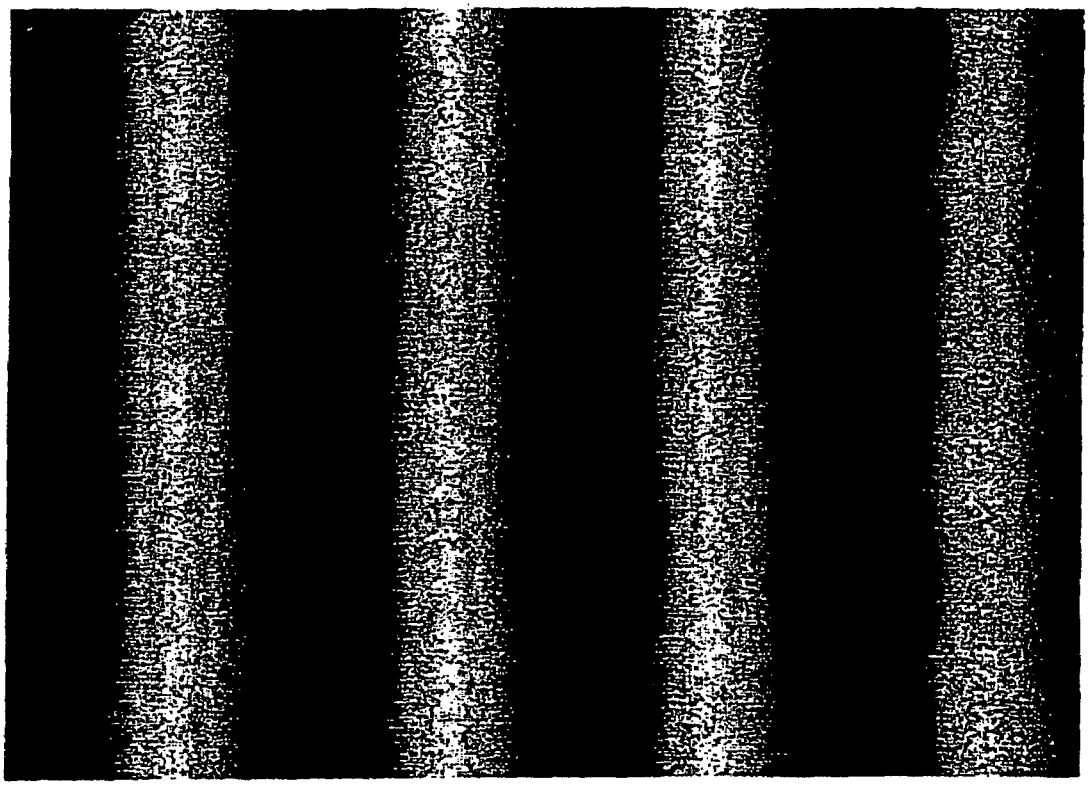
FIG. 2 shows:
a) the SEM-image of the diffraction grating. The magnification scale is about 50,000×; the mean pitch value is about 480 nm.
b) Videosignal S along the x-direction given in pixels from the same grating. Image 1 indicates the cut off level; regions 2 are the shaded areas referred to as "islands";
$T_1'$, $T_2'$, $T_3'$ are the individual pitch values;
x, x, x are the 11 centers of mass" positions.
Figure 2B:
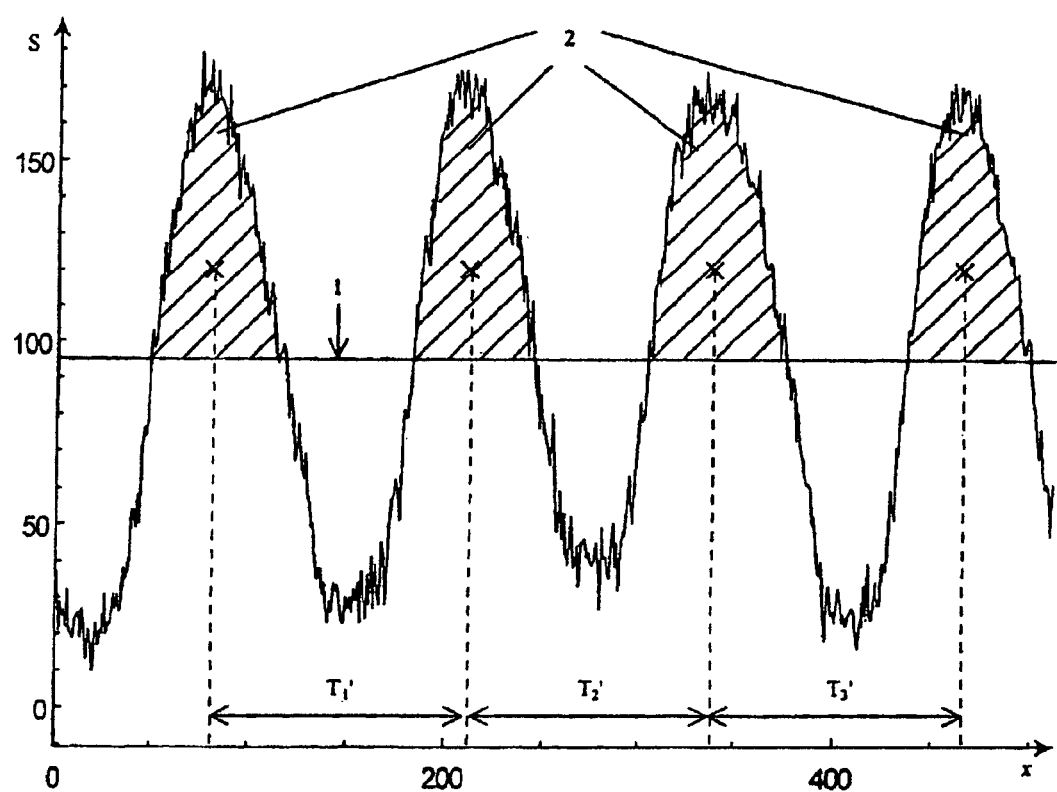
Figure 3:
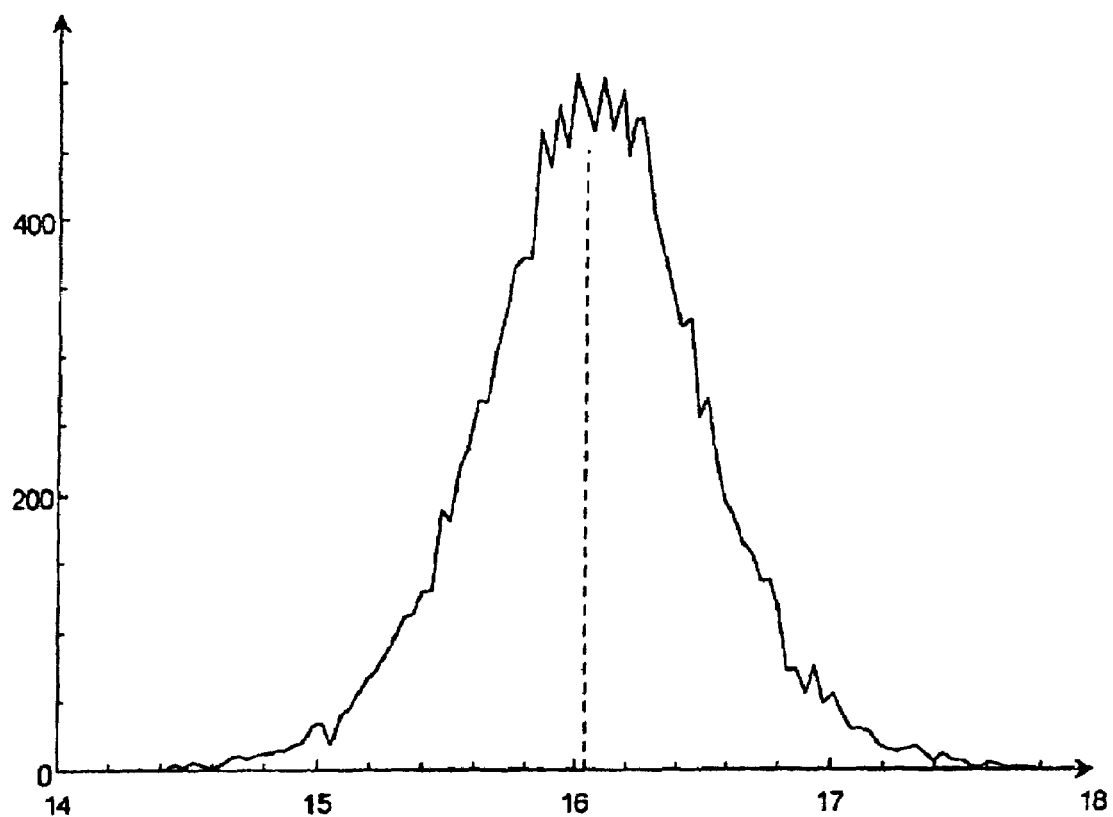
FIG. 3 shows the distribution of the individual pitch values (horizontal scale given in pixels versus vertical scale—number of center of mass pairs) obtained during image processing of the same grating. The magnification scale is 150,000×. The shape of the distribution is approximately Gaussian.

In accordance with the present invention, a method is proposed to perform accurate magnification calibration for non-scanning and scanning microscopes.

The prototype for a magnification reference material that is appropriate for performing a precision calibration procedure and being employed as a standard is presented in this patent. As an example, we shall take the method of magnification calibration which uses a special calibration reference having a repeated pitch pattern (pitch standards) 2.

This example is based on:
1. The magnification reference containing a multiple of repeatable features.
2. The features in the pattern being of equal-size and spacing.
3. The pattern having parallel feature edges in at least one orthogonal direction.
4. The magnification reference is oriented or positioned for viewing with a microscope in such a manner that the resulting image viewed in the microscope will appear to have feature edges of the magnification reference parallel to the vertical [y] microscope image axis.

Performing the procedures specified herein achieves the magnification calibration of the instrument to a high and known accuracy. If a diffraction grating (DG) with pitch T is chosen as the object by which the calibration of a microscope's magnification is to be carried out, the magnification scale M is derived from the ratio: M=T'/T, where T' is the DG pitch measured on the image (picture) of the object formed by the microscope.

The error of the magnification scale ΔM is composed of the error in the nominal value of the DG pitch—ΔT and the error ΔT' of the pitch measurement on the microscope's image of the DG. High calibration accuracy is achieved when it is possible to decrease these errors to acceptable values.

This decrease in the confirmed error of the DG pitch will correspondingly reduce the value of the measurement error in the absolute size scale. This is achieved due to the fact that the test DG consists of a great number of repeating lines that can be attested relative to the average value of its pitch using highly accurate optical diffraction methods. The achievable and achieved accuracy confirmation is evaluated below. Determination of the absolute size scale is accomplished because the wavelength of light used for the grating pitch attestation is usually known in absolute scale and with a relative error of $10^{-7}$–$10^{-8}$ A. N. Zaidel, et al "Tables of Spectral Lines", M. Fizmatgiz, 1962. The diffraction angle measurement error in the standard optical goniometer is 3–5 arc sec N. P. Gvozdeva, et al "Applied Optics and Optical Measurements, M., Machine Building 1976, which determines the total confirmed error of the average nominal pitch value of the DG ΔT/T is about $(3–5)\cdot10^{-5}$.

Let us estimate the probable value ΔT'. It was experimentally shown that when the standard algorithm using equivalent points of adjacent DG lines (this is obtained from the microscope image) is applied, the standard error of a single measurement is significant. We recommend the measurement algorithm using the "center of mass" approach. The advantages of such an approach will become clear. According to the results of the experiments we carried out, we will consider that the average nominal pitch of the DG we used is 470.72±0.01 nm, and it was obtained from the optical diffraction experiment. The SEM magnification setting was 50,000×. The SEM field of view at such magnification is less than 2 microns. On the SEM screen (or in the SEM picture) 4 DG lines and 3 spaces between them (3 pitch intervals) can be imaged in one line of the image frame. We used a 512 horizontal scan line image frame. The number of pitch measurements in one frame is 1536. If the recommended "mass center" algorithm is used for calculation of the pitch value, the standard error of a single measurement will decrease by up to 6 nanometers. In this case the variation (the standard error) of the mean measured pitch value calculated by averaging over 1536 independent measurements is 0.15 nanometers or $3*10^{-4}$ of the nominal pitch value. Mean value of T' and root-mean-square deviation (RMS) are calculated in accordance with formulae:

$$T' = \frac{\sum_{i=1}^{n} T'_i}{n}$$

$$RMS = \frac{1}{n} \cdot \sqrt{\sum_{i=1}^{n} (T'_i - T')^2}$$

where n is the number of "islands" in the frame; $T'_i$ are the individual pitch values in the microscope's image.

From the above, it is seen that the error ΔT' is the dominant error, and strongly influences the total magnification calibration error.

Notice that the same procedure can also be successfully applied to scanning electron microscopes operating at lower magnification in order to accurately determine their magnification scale. At lower magnification, the number of DG lines in each image is proportionally increased and the number of pitch patterns intersected by each horizontal scan line is increased. This results in a decrease of the principle source of error.

To calibrate microscopes at higher than 50,000× magnification, it is recommended that a DG with a smaller nominal pitch value be used to provide a higher calculated statistical measurement reliability for the average pitch measurement from the SEM image.

A description of achieving our magnification calibration reference follows. The calibration instrument used was a Cambridge Instruments SEM model "Stereoscan-360". A holographic diffraction grating was used as a magnification reference. The length of the pattern covered by the DG was greater than 1.5 centimeters. The approximate DG pitch value was 0.470 nanometers, and the total number of DG lines was greater than 30,000. The calibration of the DG pitch was performed using a model FC-5 goniometer with scale division intervals of 1 arc sec [4]. A low-pressure mercury lamp was used as a light source. The diffraction angle measurements were performed using the λ=435.835 nm wavelength mercury line. A set of 30 measurements of the diffraction angle were repeated several times. The results were averaged and the standard mean deviation was calculated. The measured diffraction angle was 67°48'11"±8" and the average value of the diffraction grating pitch was T (470.72±0.01) nm (1 sigma). The relative error of the pitch value ΔT/T was $2*10^{-5}$. The substrate containing the diffraction grating was placed into the SEM chamber and its focused image was collected in digital form. The SEM's operating conditions were: accelerating voltage was 20 kV, the probe current was 120 pA, a coaxial semiconductor backscattered electron detector was used, the frame time was 50 seconds, the number of pixels in the frame was 512×512, the number of gray levels per pixel was 256, and the magnification reading of the digital indicator was 50,000. Processing of the SEM images was carried out using our algorithm on a separate PC to calculate the pitch of the diffraction grating. More than 1500 individual pitch values (in pixels) were used, their standard statistical processing led to the average pitch value T'=120.93±0.07 pixels (1 sigma).

The width of the SEM screen Ls was 10 centimeters (512 pixels). the image of the DG was magnified M times:

$$M = \frac{L_s}{512} \times \frac{T'}{T} = 50177$$

The relative error ΔM/M may be calculated by the ratio:

$$\Delta M/M = \{(\Delta T/T)^2 + (\Delta T'/T)^2\}^{1/2}$$

After substitution of the corresponding values into the above formula we obtain:

$$\Delta M/M = 6\times10^{-4}.$$

Thus, the result of the calibration procedure, i.e. the fixed value of M can be written as:

$$M = (50.18\pm0.03)\times10^3$$

These calculations show that the magnification calibration error in the 'x' direction on this example results in an error that is less than 0.1% which confirms the fact that we are proposing a high precision method for magnification calibration.

Scanning imaging instruments typically require independent magnification calibration in the horizontal and vertical directions of the microscope's image. The example presented above describes a method for calibration of the microscope's image in the horizontal direction of the image plane. To perform a magnification calibration in the vertical direction on the image plane, the magnification reference is rotated 90 degrees such that the edges of the repeating line patterns are parallel with the top and bottom edges of the microscope's image. The image of the magnification reference is then collected and stored in a 512×512 pixel digital format. A series of up to 512 virtual, vertical line segments of the stored digital image are processed as described in the horizontal direction magnification calibration procedure above. These calculations are performed on the storage image data and enable up to 512 independent sets of pitch measurements to be made on each image. The procedure that is then followed is equivalent to the procedure described above for precision magnification calibration and results in independent magnification calibration of the microscope's image in two orthogonal directions (vertical and horizontal).

In accordance with the inventive method of achieving a magnification calibration of a microscope and the like, the steps of the method can include selecting a holographic diffraction grating with a nominal pitch size appropriate for a magnification range to be calibrated; selecting a substrate on which a number of grating lines has been sufficiently reproduced; using an optical goniometer with an angular measurement accuracy of 1 arc second; selecting 435.835 nm wavelength mercury line; performing a series of measurements at several locations on a grating; calculating a standard mean deviation from these measurements; calculating a diffraction angle obtained with said goniometer and mercury line; and calculating a diffraction pitch using Bragg's formula: $\lambda=2d*\sin\theta$.

It will be understood that each of the elements described above, or two or more together, may also find a useful application in other types of methods and constructions differing from the types described above.

The invention claimed is:

1. A method of achieving a magnification calibration reference with a pitch accuracy of ±0.01 nm suitable for precision magnification calibration of imaging instruments comprising the steps of selecting a holographic diffraction grating with a nominal pitch size appropriate for a magnification range to be calibrated; selecting a substrate on which a number of grating lines has been sufficiently reproduced; using an optical goniometer with an angular measurement accuracy of 1 arc second; selecting 435.835 nm wavelength mercury line; performing a series of measurements at several locations on a grating; calculating a standard mean deviation from these measurements; calculating a diffraction angle obtained with said goniometer and mercury line; calculating a diffraction pitch using Bragg's formula: $\lambda=2d*\sin\theta$; and calibrating a magnification of an imaging instrument with the use of the calculated diffraction pitch.

* * * * *